Sept. 1, 1936.  J. A. SARGENT  2,053,206
AUTOMOBILE AIR COOLING MEANS
Filed Sept. 6, 1933  2 Sheets-Sheet 2
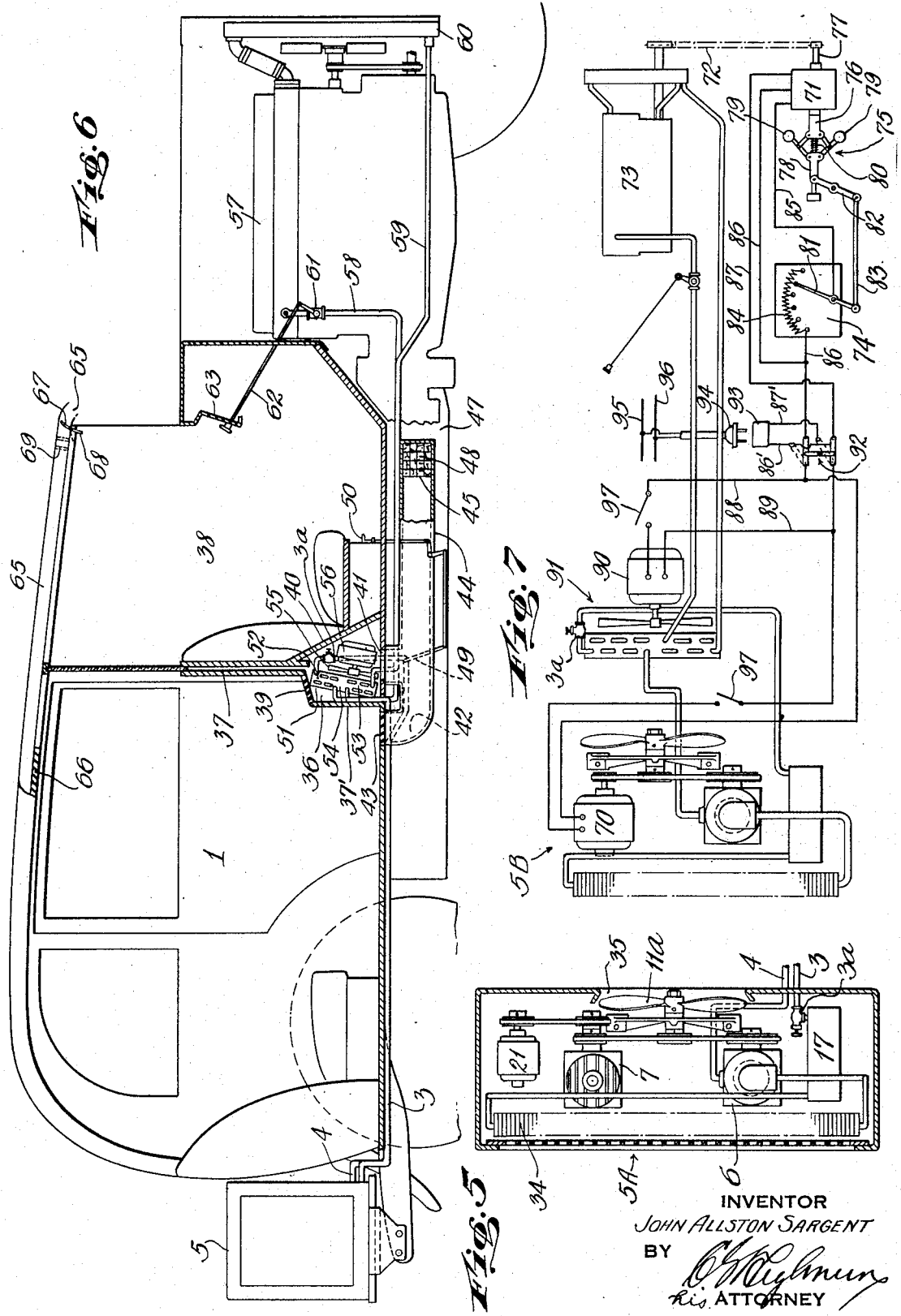
INVENTOR
JOHN ALLSTON SARGENT
BY
his ATTORNEY Patented Sept. 1, 1936

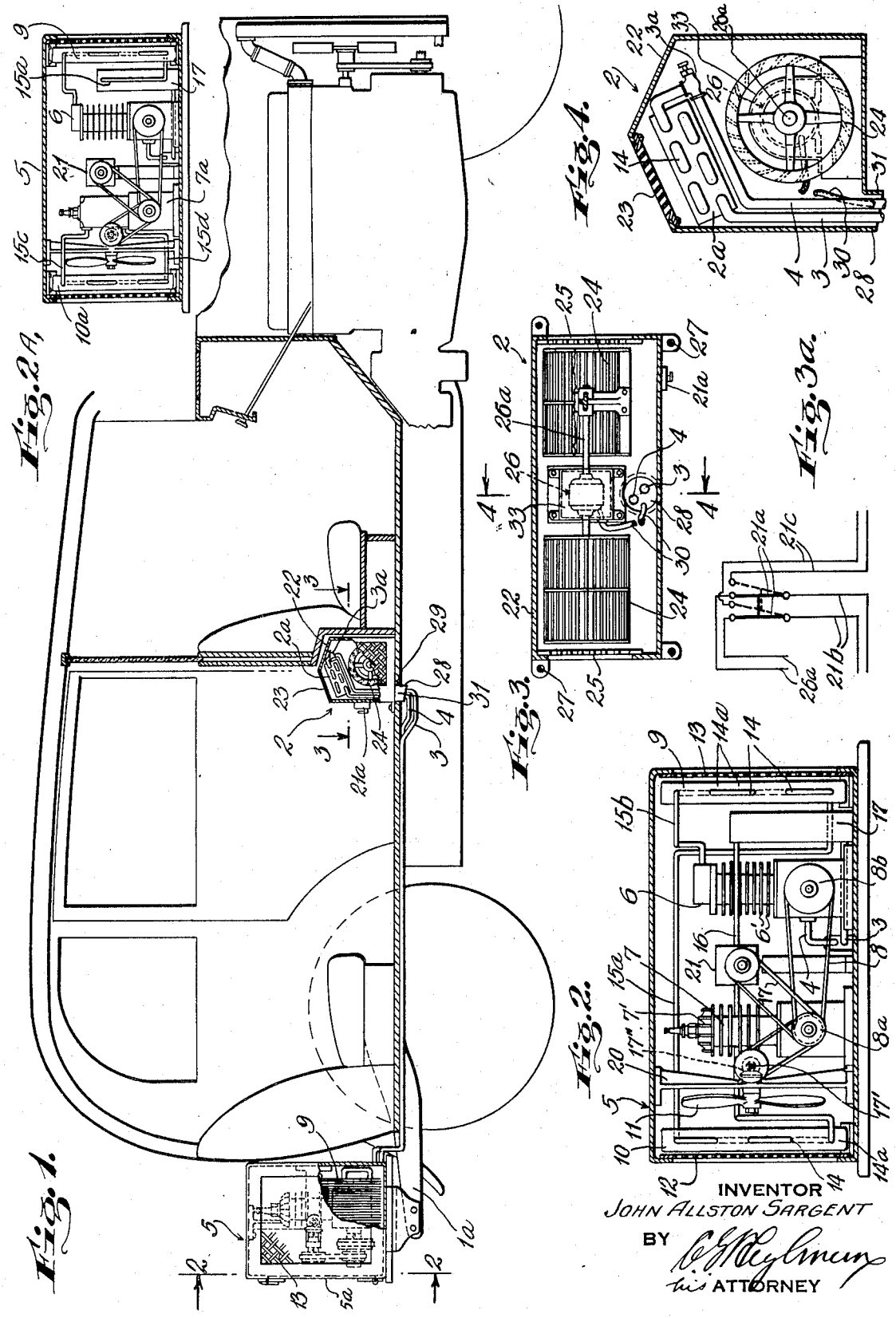

2,053,206

UNITED STATES PATENT OFFICE 2,053,206

AUTOMOBILE AIR COOLING MEANS

John Allston Sargent, Bronxville, N. Y., assignor to Campbell Metal Window Corporation, New York, N. Y., a corporation of Maryland Application September 6, 1933, Serial No. 688,291

10 Claims. (Cl. 62—117)

The general object of the present invention is to provide simple and effective automobile air cooling means, especially devised and adapted for use in cooling the passenger space of an automobile, having body enclosing such a passenger space. In my prior application, Serial No. 684,172 filed August 8, 1933, I have disclosed various forms of apparatus for maintaining desirable atmospheric conditions in the passenger space of an automobile, and comprising a cooling element and refrigerating apparatus for cooling a refrigerant fluid and circulating it through the cooling element, and a primary object of the present invention is to provide an improved arrangement and disposition of refrigerating apparatus adapted for use in the general manner and for the general purposes disclosed in said prior application.

The refrigerating apparatus specifically illustrated and described in the said prior application included a compressor operated by energy supplied by the propulsion engine of the automobile, through an energy transmitting connection which in one form included a variable speed gear connection between the engine and compressor shafts, and in other forms including an electric motor driving the compressor and energized by current supplied by an electric generator driven by the engine. While some of the principles of the present invention may be utilized and some of its advantages obtained with refrigerating apparatus including a compressor driven by an electric motor energized by current supplied by a generator driven by the propulsion engine of the automobile, a specific object of the present invention is to provide refrigerating apparatus energized independently of the propulsion engine of the automobile.

An important object of the present invention is to provide a refrigerating unit including simple and effective means for cooling and circulating the refrigerant fluid passed through the cooling element of. the automobile and adapted for bodily attachment as a unit to an automobile in any convenient location, and which in the preferred form of the invention is adapted to be mounted on the automobile body at its rear in the position in which a trunk or baggage receptacle is frequently mounted. This disposition of the refrigerating unit makes it unnecessary to mount any portion of the refrigerating apparatus proper beneath the body of the automobile, makes the refrigerating unit readily accessible for inspection and adjustment, and permits the unit to be bodily removed for repair shop or factory adjustments and repairs. A further and important advantage of the use of such a refrigerating unit is that it may be added to existing types of automobiles without any structural alteration of the latter. Moreover, the use of the invention ordinarily requires no alteration in the appearance of the automobile, since in many cases, the housing of the unit may well be similar in form and appearance to the trunk at the rear of the automobile replaced by the unit.

In a preferred embodiment of the present invention, my improved refrigerating unit comprises a compressor driven by an internal combustion engine separate from the propulsion engine of the automobile and forming a part of the unit and also driving fan means included in the unit for moving air through the latter to cool the refrigerant condenser portion of the unit. In some cases, however, the unit may comprise an electric motor driving the compressor and associated fan means of the unit, and energized by current furnished by the automobile electric starting and lighting system or by current supplied by a separate electric generator provided for the purpose and driven by the propulsion engine, as in arrangements specifically illustrated and described in my said prior application.

While in some cases the cooling element may be incorporated in the body structure, as in constructions illustrated in my said prior application, a specific object of the present invention is to provide a cooling element suitable for its purpose and adapted for placement in the passenger space of existing automobiles of various types without requiring any structural change in the automobile in which the element is installed, other than the formation of a hole in the floor of said passenger space for the passage of refrigerant pipes and electrical conductors, and for the escape of water condensing out of the air cooled in the cooling element. In general the cooling element requires an air circulation fan driven by an electric motor. The latter may be energized by current drawn from the automobile lighting and main engine starting system in some cases. Advantageously, in some cases, however, the current for operating the fan may be supplied by a dynamo electric machine included in the refrigerating unit and driven by the same engine which drives the compressor of the unit. When such a dynamo electric machine is included in the refrigerating unit it may advantageously be of a type suitable for operation as a motor to start the engine of the unit into operation, current for such operation being furnished by the automobile lighting and main engine starting system.

While my invention in its preferred forms is characterized by the fact that the refrigerating unit and cooling element employed may each be readily added to an existing automobile of any one of most forms in common use, some of the principles of the present invention may advantageously be used in connection with automobiles designed and constructed to initially make use of the invention. In such case, the cooling element may advantageously be incorporated in a chamber provided for the purpose in the automobile body, and its cooling coil may be used in the winter time as a heating element connected to the propulsion engine cooling system or otherwise supplied with waste heat available in the operation of the propulsion engine, or may then be replaced by a special heating element supplied with heat in the same general manner. In either case cooling element and the refrigerating unit may be removed during periods in which automobile cooling is not required.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

Of the drawings:

Fig. 1 is a somewhat conventional illustration in elevation and with parts broken away and in section of an automobile including one form of the present invention;

Fig. 2 is a section on the line 2—2 of Fig. 1;

Fig. 2a is a view taken similar to Fig. 2, but on a smaller scale and illustrating a modification;

Fig. 3 is a section on the line 3—3 of Fig. 1;

Fig. 3a is a switch diagram;

Fig. 4 is a section on the line 4—4 of Fig. 3;

Fig. 5 is a sectional plan view of a refrigerating unit differing in form from that shown in Figs. 1 and 2;

Fig. 6 is a view generally similar to Fig. 1 illustrating a modified cooling element arrangement and means for adding purified fresh air to the automobile space being cooled.

Fig. 7 is a diagrammatic representation of an arrangement in which the propulsion engine of an automobile drives a generator supplying current for energizing the cooling element fan motor and an electric motor included in the refrigerating unit for operating the compressor and fan of the latter.

In the embodiment of the invention, illustrated by way of example in Figs. 1–4, a cooling element 2 is employed to cool the main passenger space 1 of an automobile comprising a body of the well known four door sedan type enclosing said space. The cooling element 2 comprises a pipe coil 2a for the flow of a refrigerant fluid passing to and from the element through supply and discharge pipes 3 and 4, respectively. The pipes 3 and 4 extend between the element 2 and the refrigerant fluid outlet and inlet, respectively, of a refrigerating unit 5. The latter comprises a housing connected, and preferably detachably connected, to the automobile body at the rear of the space. As shown the unit 5 occupies a position at the rear of the body of an automobile which in various types of automobiles is customarily occupied by the trunk or baggage receptacle. As conventionally illustrated, the refrigerating unit 5 comprises a box like housing which rests upon and is suitably secured to frame extensions or bracket portions 1a projecting rearwardly from the lower portion of the enclosed portion of the automobile body.

In the form illustrated in Figs. 1 and 2, the apparatus enclosed in the housing of the unit 5, comprises a compressor 6, an internal combustion engine 7 driving the compressor 6 through a belt 8, a condenser including a primary condensing section 9 and a secondary condensing section 10, and a fan 11 driven by the engine 7. As shown the condenser sections 9 and 10 are located adjacent the opposite ends of the housing which is provided at one end with a grill 12 for the admission of atmospheric air which is drawn through the adjacent condenser section 10 by the fan 11, and passes from the housing of the unit through the grill 13 at its opposite end, after flowing past heat dissipating portions 7' and 6' of the engine 7 and compressor 6, and after passing through the condenser section 9 which extends immediately in front of the grill 13. Advantageously and as shown each condenser section comprises horizontal pipe sections 14 traversing fin plates 14a extending in vertical planes transverse to the lengths of the pipe sections or convolutions traversing them, and spaced apart to provide a multiplicity of air passages, as is customary in heat exchange apparatus of this general type. As shown, the outlet or return pipe 4 from the cooling element 3 is connected to the inlet of the compressor 6. The outlet from the latter is connected by a pipe 15b to the inlet of the condenser section 9. The outlet from the condenser section 9 is connected to the inlet of the condenser section 10 by a pipe 15a. A pipe 16 connects the outlet of the condenser section 10 to the supply pipe 3 running to the element 2. Ordinarily, and as shown, the connection between the pipes 16 and 3 is not direct, but through a receiver tank 17 mounted in the housing of the unit 5.

In some cases, at least, the engine 7 desirably operates with a shaft speed higher than the shaft speed of the compressor 6. This difference in shaft speeds is provided for in the construction illustrated in Fig. 2, by making the pulley 8a on the shaft of the engine 7 and driving the belt 8, suitably smaller in diameter than the driven pulley 8b on the shaft of the compressor 6. As shown the shaft of the engine 7 extends longitudinally of the automobile and transversely of the shaft of the fan 11. The driving connection between the shaft of the engine 7 and fan 11 comprises a belt 17 running over a driving pulley on the shaft of the engine and a driven pulley on a parallel shaft 17' which is connected by bevel gears 17'' to the shaft of the fan 11. The shaft of the fan 11 and the shaft 17' are shown as journalled in a spider member 20 extending between the top and bottom walls of the unit housing.

The various parts 6–20 of the unit may be connected by suitable framework into a mechanical unit bodily insertible in and removable from the housing 5 when the latter is opened up, as by the removal of its removable rear wall 5a. The construction may be simplified and its weight reduced, however, by utilizing the housing body as the supporting framework for the parts 5–20 inclusive. To this end, the bottom wall of the housing may be formed to serve as a base on which the engine, compressor, condenser sections, receiver, etc., are detachably secured. In addition, as shown, the condensers and the spider 20 are detachably connected to the top wall of the housing.

Various expedients used to start small internal combustion engines into operation may be employed to start the engine 7. Advantageously, in most cases, however, an electric starting mechanism is provided. In some cases that mechanism may be energized by current, supplied by the system (not shown) with which the automobile is supplied for lighting and to start the main or propulsion engine of the automobile, and in such cases the engine 7 is advantageously belted or gear connected to a small dynamo electric machine 21 included within the housing of the unit 5 and operating as a motor to start the engine 7 into operation. In some cases, the dynamo electric machine 21 employed as a motor to start the engine 7 is also adapted to serve, when the engine 7 is in regular operation, as a generator supplying current to energize the motor 26 of a fan employed as hereinafter described to move air over the cooling coil of the element 2. The machine 21 may thus be converted into a motor energized from the automobile lighting and starting systems, or into a generator, by a switch 21a conveniently mounted on the casing of the cooling element 2.

As diagrammatically illustrated in Fig. 3a, the switch 21a is a double pole switch which in its full line position connects conductors 21b leading from the terminals of the machine 21 to the terminal conductors 26a of the motor 26 for energization of the latter when the machine 21 is operating as a generator. In its dotted line position the switch 21a connects the conductors 21b to conductors 21c, which are branches from the automobile lighting and main engine starting system of proper polarity for operating the machine 2 as a starting motor for the engine 7.

The cooling element shown in Fig. 1, and in greater detail in Figs. 3 and 4, is a unitary structure adapted for insertion in the passenger space of an existing automobile with no structural alteration in the latter other than the formation of a hole or holes in the floor of the passenger space for the passage of the pipes 3 and 4 and certain electric conductors and for the drainage of moisture condensed out of the air cooled by the cooling action of the refrigerant flowing through the cooling element pipe coil 2a. In the form shown in Figs. 1, 3 and 4, the element 2 comprises a housing or casing 22 adapted to be placed on the floor of the passenger space of the automobile ordinarily and as shown, immediately back of the front seat or seats of an automobile of the type illustrated. The cooling coil 2a of the element 2 may be generally similar to each of the condenser sections 8 and 9, in that it consists of parallel horizontal pipe sections connected by return bends and traversing transverse spaced apart fin plates. As shown the cooling coil 2a is located within the casing 22 adjacent the upper portion of the latter and immediately beneath an upper inclined grill wall portion 23 of the housing. At a level below that of the cooling coil, I place a fan or fans for moving air into the casing 22 and over the cooling coil of the cooling element and back into the passenger space of the automobile through the grill 23. To this end, in the form shown in Figs. 3 and 4, I make use of two fans 24, of the well known axial inlet, peripheral discharge type. The fans are located one adjacent each end of the casing 22, and coaxial with an air inlet 25 formed in the corresponding end wall. The two fans 24 are carried by the oppositely extending end portions of the armature shaft 26a of an electric fan motor 26 mounted within the casing 22. As shown, the casing 22 is detachably secured, as by screws or bolts 27, to the floor of the passenger space of the automobile, and is formed with a bottom outlet opening 28 in the register with an opening 29 formed in the floor of the automobile.

As shown the pipe 3 is connected to the inlet of the coil 2a through an expansion valve 3a within the housing 22, and of any usual or suitable type. The pipes 3 and 4 pass through the openings 28 and 29 as does a cable 30 including the energizing circuit conductors for the motor 26 and other conductors necessarily connected to the previously mentioned switch 21a which is mounted on the casing 22. The casing 22 is advantageously provided with a vertical conduit section 31 leading downward from the opening 28 through the opening 29 for the discharge of water of condensation formed within the casing 22. Any usual or suitable provisions may be employed, when necessary or desirable to convey water of condensation to the outlet 28 from the lower portion of the cooling coil. However, with the arrangement shown, if the frame of the motor 26 is suitably formed and shaped, or is enclosed by a hood 33 as shown, to prevent passage of the condensate into the motor proper, the condensate may be allowed to rain down from the cooling coil so that no special condensate selecting provisions are ordinarily required. For use in heating the space 1 in the winter time the coil 2a in the casing 22 may be replaced by a heating coil or device. In such case a heating fluid may be supplied to the heating coil, and the fan motor 26 may be operated in some suitable manner such as that illustrated in Fig. 7.

As has already been made apparent the refrigerating unit 5 and cooling element 2 may be incorporated in an existing automobile of various types with no structural change or alteration in the automobile, other than the formation of the floor opening 29, though the addition of circuit connections may be necessary to connect the switch 21a to the electric lighting and main engine starting system of the automobile when that system is utilized to start engine 7 into operation and connections (not shown) for supplying the engine 7 with fuel from the main fuel tank of the automobile are required unless the unit includes a separate and ordinarily unnecessary fuel tank for the engine 7.

As will be readily apparent to those skilled in the art, the form of the refrigerating unit 5, and the disposition of its essential elements, may vary greatly from those illustrated in Figs. 1 and 2. For example in the refrigerating unit 5A shown in Fig. 5 the two condenser sections 8 and 9 located adjacent the opposite ends of the housing of the unit 5 are replaced by a single condenser unit 34 extending transversely to the automobile axis immediately in front of the unit housing rear wall which in this case is perforated for the distributed discharge of air passed through the condenser 34. In the construction shown in Fig. 5, air enters the unit housing through an inlet 35 in the front wall of the housing, which is spaced away from the adjacent portion of the automobile body. Directly in front of the inlet 35 is located the circulating fan 11a which may have its shaft belted directly to the shaft of the engine 7.

The unit 5B shown in Fig. 2a differs from the unit 5 of Fig. 2 in that it comprises a water cooled internal combustion engine 7a in lieu of the air cooled engine 7 as shown in Fig. 2. In such case, the condenser section 10 of Fig. 2 may serve as or be replaced by the radiator 10A of the engine cooling system as shown in Fig. 2a. In the latter figure, the outlet 15a from the condenser section 9, constituting the entire refrigerant condenser of the unit, is connected directly to the receiver 17, the pipe 15c connects the top of the water jacket space of the engine 7a to the top of the radiator 10a, and the bottom of the latter is connected by a pipe 15d to the bottom of said water space. The air impelling effect of the fan 11 in Fig. 2a is preferably the reverse of that in Fig. 2, so that the relatively cool air entering the unit housing first acts on the refrigerating condenser 9.

While the capacity of the apparatus required for the effective use of the present invention will vary largely with conditions of use, and necessarily is much greater in the case of an automobile bus seating twenty or thirty or more passengers, for example, than in the case of an ordinary passenger automobile with a normal seating capacity for not more than six or seven persons, it is noted by way of example and not by way of limitation, that with an ordinary five passenger automobile of the general type illustrated in Fig. 1, the engine 7 may be of three or four nominal horsepower. Such an engine may well have a normal running speed of sixteen hundred revolutions per minute, which is also a suitable speed for the fan 11, but the compressor speed may be in the neighborhood of four hundred revolutions per minute only.

In the arrangement shown in Fig. 6, a heat exchange element 51 including cooling coil analogous to the coil 2a is located in a compartment or space 36 in the automobile body specially provided for that purpose. As shown, the compartment 36 is directly beneath the upper portion of the partition 37, which in the particular automobile form shown in Fig. 6, separates the main passenger compartment 1 from a driver's compartment 38. The rear wall of the compartment 36 is formed by what may be regarded as an offset lower portion 37' of the partition 37. The body portion of the partition 37 is connected at its lower edge to the upper edge of the portion 37' by an inclined wall portion including a grill 39 permitting the outflow of air from the compartment 36 into the compartment 1. The front wall of the compartment 36 is formed by the rear portion of the supporting framework 40 for the seat or seats in the driver's compartment. The compartment 36 receives air through a bottom opening 41 from a conduit 42, the latter receiving air from the compartment 1 through an opening 43 in the floor of the latter. The conduit 41 has a forwardly extending fresh air supply section 44 with an air inlet 45 opening to the atmosphere through the riser or apron portion of the running board structure 47 at one side of the car. Advantageously, as is shown in my said prior application, the conduit 42 is bifurcated to provide two extensions 44, one running to the riser at each side of the car. A filter device 48 is provided at the inlet end of each extension for the purpose of eliminating dust and analogous foreign matter from the entering air, and including a chemical purifying agent, as activated carbon for absorbing noxious vapors or gases from the air. A damper 49 in the conduit is provided to throttle the admission of fresh air into the compartment 36, and may be adjusted by an operating device 50.

The heat exchange element 51 located in the compartment 36 comprises an upper cooling coil 52 and a lower heating coil 53. As shown the pipe sections of both coils pass through the same spaced apart fin plates 54. The cooling coil 51 may serve the same purpose as the similar cooling coil 2a previously described, and is similarly connected by pipes 3 and 4 to the refrigerating apparatus of the unit 5, which is shown as mounted as in Fig. 1. Associated with the heat exchange element is a fan 55 driven by a motor 56. The top wall of the conduit 42 includes a trough like portion for the reception and discharge of water of condensation dripping down from the element 51.

The heating coil 53 of the heat exchange element 51 may be similar in construction to the previously described cooling coil 2a and may be supplied with a heating fluid from any available source at times when it is desirable to heat the interior of the automobile. As shown in Fig. 6, the heating fluid supplied to the coil 53 is cooling fluid used in the cooling system for the main propulsion engine 57 of the automobile. To this end the inlet to the heating coil 53 is connected by pipe 58 to the upper portion of the water jacket space of the engine 57 and the outlet from the heating coil is connected by a pipe 59 to the water space at the lower end of the radiator 60 forming a part of the engine cooling system. The pipes 58 and 59 and the heating coil 53 form a by-pass about the radiator for the flow of more or less of the engine cooling fluid. The flow through this by-pass may be regulated by a throttle valve 61 located in the pipe 58 and adjusted manually or automatically as conditions make desirable. As shown the valve 61 is subject to manual adjustment by a valve operating rod 62 extending through the instrument board 63 in the driver's compartment of the automobile. In the arrangement shown in Fig. 6 some or all of the fresh air supplied to the compartment 1 may be supplied through a fresh air supply conduit 65 carried by the roof portion of the automobile body and shown as arranged with its inlet at or adjacent the front end of the roof portion. The conduit 65 is shown as having its inlet end in communication with the external atmosphere in front of the windshield of the automobile and as having its rear discharge end opening downward into compartment 1 through a grill 66 in the roof of the compartment located slightly to the rear of the partition 37. A damper 67 having an operating member 68 is shown for regulating the inflow of air into the compartment 1 through the conduit 65 at its front or inlet end. The conduit 65 is provided with a filter 69 similar in purpose and character to the previously described filter.

In respect to the location of the heat exchange element 51 in the compartment 36 formed in the body of the automobile and in respect to the means shown in Fig. 6 for supplying purified fresh air to compartment 1 and for supplying heating fluid to the heating coil 53, the arrangement shown in Fig. 6 does not differ from what is disclosed in my said prior application. In said prior application however the refrigerating apparatus to which the cooling coil is connected by the pipes 3 and 4 differs somewhat from the apparatus included in either of the units 5 and 5a and is not located, or arranged in a unit suitable for location at the rear of the automobile in accordance with the present invention.

The arrangement illustrated diagrammatically in Fig. 7, includes a refrigerating unit 5B shown as generally like the previously described unit 5A, though it might equally well be generally like the previously described unit 5, but the source of mechanical energy within the unit is an electric motor 70 which replaces the internal combustion engine 7 of the units 5 and 5A. Motor 70 is supplied with energizing current, as shown in Fig. 7, by a special generator 71 driven, as by a chain belt 72, from the shaft of the propulsion engine 73 of the automobile. In order that it may supply current at a suitably constant voltage notwithstanding variations in the speed of engine 73, the generator 71 is provided with a suitable voltage regulator. As shown that regulator comprises a rheostat 74 which is automatically adjusted by a device 75 responsive to the speed of the generator. The device 75 is shown as of the centrifugal speed governor type and comprises a collar 76 secured to the shaft 77 of the generator 71, a collar 78 slidingly mounted on the shaft 77 and centrifugal weights 79 pivotally connected to the collars 76 and 78 in the usual manner, so that as the speed of the generator shaft 77 increases the centrifugal force action on the weights 79 will move the collar 78 toward the collar 76 against the yielding resistance to such movement of the usual loading spring 80, the latter moving the collar 78 away from the collar 76 as the speed of the shaft 77 diminishes. The longitudinal movement of the collar 78 on the shaft 77 is transmitted to the operating arm 81 of the rheostat 74 by a lever 82 and link 83 so that the arm 81 is turned in a clockwise or counter-clockwise direction accordingly as the speed of the generator shaft 77 diminishes or increases.

As the generator speed increases and decreases, the corresponding pivotal movement of the arm 81 provides corresponding changes in the generator voltage by respectively increasing or decreasing the amount of the rheostat resistance 84 in the field circuit of the generator 71 which is self-exciting and has an exciting circuit terminal connected by conductor 85 to the arm 81, the left-hand end of the resistance 84 as seen in Fig. 2 being connected to the conductor 86 leading away from one of the main terminals of the generator. The conductor 86 and the conductor 87 connected to the second main terminal of the generator, form the current supply conductors for energizing the motor 70.

Branch conductors 88 and 89 extend from the conductors 86 and 87 to the terminals of a fan motor 90 associated with the heat exchange element 91, which is shown in Fig. 7 as similar to the heat exchange element of Fig. 6, though of course the heat exchange element 91 employed in Fig. 7 might be similar to the cooling element of Figs. 1, 2, 3 and 4.

When as in such an arrangement as is shown in Fig. 7, the refrigerating apparatus and air moving means are operated by suitable electric motors, means may advantageously be provided for the operation of the motors from an ordinary or light power circuit, such as that ordinarily available in a garage in which the automobile may be stored at times when the automobile is not in use and without requiring the operating of the automobile engine at an idling speed. This permits the cooling and ventilation of the automobile preparatory to its use after a period of non-use in which the automobile body has become heated up or filled with foul air. To permit such operation of the motors 70 and 90 of Fig. 7, there may be associated with the conductors 86 and 87, a switch 92, which may be adjusted from the position shown in full lines in Fig. 7 in which the terminals of the motors are conducted to the generator 71 into the position shown in dotted lines in which the terminals of the motors are connected through branch conductors 86' and 87' to the terminals of a socket 93 mounted on the automobile body and adapted to removably receive a plug or conductor, 94. The latter when in place in the socket 93 connects the branch conductor 86' and 87' to garage or other supply conductors 95 and 96. Each of the motors 70 and 90 may well be provided with individual controlling means including a cut-out switch 97 though ordinarily the use of the refrigerating apparatus requires the operation of both motors with constant relative speeds. However, with the refrigerating apparatus out, and the heating means in service, the operation of the motor 90 may be desirable although the motor 70 is not then required, and the unit 5B may then be removed from the automobile.

While in accordance with the provisions of the statute I have illustrated and described the best forms illustrated and described by way of example, the best forms of my invention now known to me, will be apparent to those skilled in the art that changes may be made in the forms of apparatus illustrated herein without departing from the spirit of my invention as set forth in the appended claims, and that certain features of my invention may sometimes be used with advantage without a correspondent use of other features.

Having now described my invention, what I claim as new and desire to secure by Letters Patent, is:

1. The combination with an automobile having a body enclosing a passenger space and an external trunk support, of a cooling element for cooling said space and a refrigerant unit mounted on said support for abstracting heat from a refrigerant fluid and circulating the latter through said unit and element, said unit comprising a housing formed with an air inlet and with an air outlet spaced away from inlet, and refrigerating apparatus within said housing comprising a compressor, a condenser between said inlet and outlet, means for moving air into said housing through said inlet and out of said housing through said outlet and a motor for operating said compressor and air moving means.

2. In a cooling system, the combination of a cooling element, air circulating means including a fan motor, a heat dissipating element, a refrigerant compressor, and an internal combustion engine driving said compressor, a dynamo electric machine connected to said engine and circuit means for energizing said machine to operate as a motor in starting said engine and for operating said fan motor with current generated by said machine when said engine is in operation.

3. In a cooling system, the combination of a cooling element, air circulating means including a fan motor, a heat dissipating element, a refrigerant compressor and an internal combustion engine driving said compressor, a dynamo electric machine connected to said engine, current supply conductors, and a switch for optionally connecting the terminals of said machine to said conductors for operation of said machine as a motor in starting said engine and to the terminals of said fan motor for operation of the latter by current generated by said machine when said engine is in operation.

4. In a passenger automobile having a propulsion engine and a body enclosing a passenger space and provided with an external trunk support, an air cooling element for said space, a refrigerating unit mounted on said support including a heat dissipating element, a compressor and an electric motor driving the compressor, connections for the circulation of a refrigerant fluid between said compressor and element, and means for energizing said motor comprising an electric generator driven by said propulsion engine and regulating means making the voltage of said generator substantially independent of the speed of said engine.

5. The combination with an automobile body having a passenger space, of means for cooling and circulating a fluid refrigerant to cool said space, said means comprising a refrigerant unit including a housing mounted on said body at the rear of the latter and formed with air inlet and outlet openings, and a fluid refrigerant compressor, a condenser, air moving means and an internal combustion engine within said housing, said engine operating said compressor and operating said air moving means to move air into said housing through said inlet opening and out of said housing through said outlet opening whereby said air removes heat from said engine, compressor and condenser.

6. The combination with an automobile body having a passenger space, of means for cooling and circulating a fluid refrigerant to cool said space, said means comprising a refrigerant unit including a housing mounted on said body at the rear of the latter and formed with air inlet and outlet openings and refrigerating apparatus within said housing comprising a fluid refrigerant compressor, a condenser, air moving means, an internal combustion engine, a speed reducing drive connection between said engine and compressor and a driving connection between said engine and air moving means for operating the latter to move air into said housing through said inlet opening and out of said housing through said outlet opening to thereby remove heat from said engine, compressor and condenser.

7. The combination with an automobile body having a passenger space, of means for cooling and circulating a fluid refrigerant to cool said space, said means comprising a refrigerant unit including a housing mounted on said body at the rear of the latter and formed with an air inlet in one, and an air outlet in the other of its walls extending in the direction of the length of the automobile body, and refrigerating apparatus within said housing comprising a compressor, a two-section condenser having one section adjacent said inlet and its other section adjacent said outlet, fan means for moving air into said housing through said inlet and out of said housing through said outlet and a motor for operating said compressor and air moving means.

8. The combination with an automobile body having a passenger space, of means for cooling and circulating a fluid refrigerant to cool said space, said means comprising a refrigerant unit including a housing mounted on said body at the rear of the latter and formed with an air inlet in its side adjacent the end of said body and an air outlet in its opposite side, and refrigerating apparatus within said housing comprising a compressor, a condenser, adjacent said outlet, means for moving air into said housing through said inlet and out of said housing through said outlet and a motor for operating said compressor and air moving means.

9. In an automobile having a passenger space, the combination with refrigerant fluid cooling and circulating means, of a cooling element removably placed on the floor of said space and comprising a housing with an air inlet and an air outlet and a cooling coil and motor driven fan within said housing, said fan operating to move air into said housing through said inlet, past said cooling coil, and out of said housing through said outlet, said housing being provided with a tubular extension at its bottom extending through the floor of said space and to permit the discharge of water of condensation formed within the housing by the cooling action of said coil, and fluid refrigerant pipes extending through the floor of said space and said tubular extension and connecting said coil to said means.

10. In an automobile having a passenger space, the combination with refrigerant fluid cooling and circulating means, of a cooling element removably placed on the floor of said space and comprising a housing with an air inlet at each end and an upper air outlet, a cooling coil located in the upper portion of the housing, and air moving means within said element, comprising an electric motor between said inlets and a fan of the axial inlet radial discharge type adjacent each inlet and carried by the corresponding end of the motor shaft, said fan operating to move air into said housing through said inlet from said cooling coil and out of said housing through said outlet, said housing being provided with an opening in its bottom to permit the escape of water condensation formed within the housing by the cooling action of said coil, and fluid refrigerant pipes extending through said opening and connecting said coil to said means.

JOHN ALLSTON SARGENT.